United States Patent [19]
Smith

[11] 3,976,989

[45] Aug. 24, 1976

[54] ELECTRONIC PRESSURE CYCLE INDICATOR

[75] Inventor: Carl H. Smith, Spring Valley, N.Y.

[73] Assignee: Auto Research Corporation, Rochelle Park, N.J.

[22] Filed: Mar. 3, 1975

[21] Appl. No.: 554,402

[52] U.S. Cl. ............................. 340/270; 137/552.7; 184/1 C; 235/92 T; 340/240
[51] Int. Cl.² ..................... G08B 21/00; F01M 1/18
[58] Field of Search ........ 340/270, 240, 419, 213 Q, 340/421, 279; 324/186; 235/92 T; 184/6.4, 1 C; 137/552.7, 459, 624.13

[56] References Cited
UNITED STATES PATENTS

| | | | |
|---|---|---|---|
| 2,435,181 | 1/1948 | Lindsay | 340/421 |
| 2,676,315 | 4/1954 | Kyle | 340/419 |
| 2,851,596 | 9/1958 | Hilton | 324/186 |
| 3,127,954 | 4/1964 | Callahan et al. | 340/421 |
| 3,381,776 | 5/1968 | Gruber et al. | 184/6.4 |
| 3,527,322 | 9/1970 | Roberts | 340/270 |
| 3,547,106 | 12/1970 | Bornmann | 340/279 |
| 3,631,438 | 12/1971 | Lewin | 340/240 |
| 3,735,377 | 5/1973 | Kaufman | 340/419 |
| 3,855,574 | 12/1974 | Welty | 340/279 |
| 3,920,961 | 11/1975 | Berg | 235/92 T |

*Primary Examiner*—Glen R. Swann, III
*Attorney, Agent, or Firm*—Ostrolenk, Faber, Gerb & Soffen

[57] ABSTRACT

A fluid pressure sensor is employed as a safety device for sensing lubricant pressure levels. A timer is activated to turn on a pump at regular intervals to provide lubrication at such intervals. Pump operation supplies lubricant to a dispensing network which, in turn, causes closure of a pressure switch for activating an oscillator. A comparator circuit compares the accumulated count of oscillator pulses against a predetermined threshold level to trigger an electronic switch which activates an alarm. The pressure switch closure sets a bistable circuit which, in turn, activates said oscillator circuit for incrementing a programmable binary counter circuit. The long-time interval before actuating logical gating circuitry, which interval is adjustable by programming of the binary and/or the R.C. elements in the oscillator circuit and which typically may be of the order of hours, or even days, continues until the voltage output of the logical gating circuitry reaches a predetermined threshold level causing the bistable circuit to reset and turn off the oscillator and causing the activation of the electronic switch. The alarm activated by the electronic switch may be a lamp which is energized to indicate that an unusually prolonged period of time has occurred since the last pump operation. Operation of the timing circuit is not reinitiated until the pressure switch again undergoes a switch closure operation which automatically sets the bistable circuit and turns the lamp off. The delay of the timing circuit is not significantly affected by transients.

4 Claims, 1 Drawing Figure

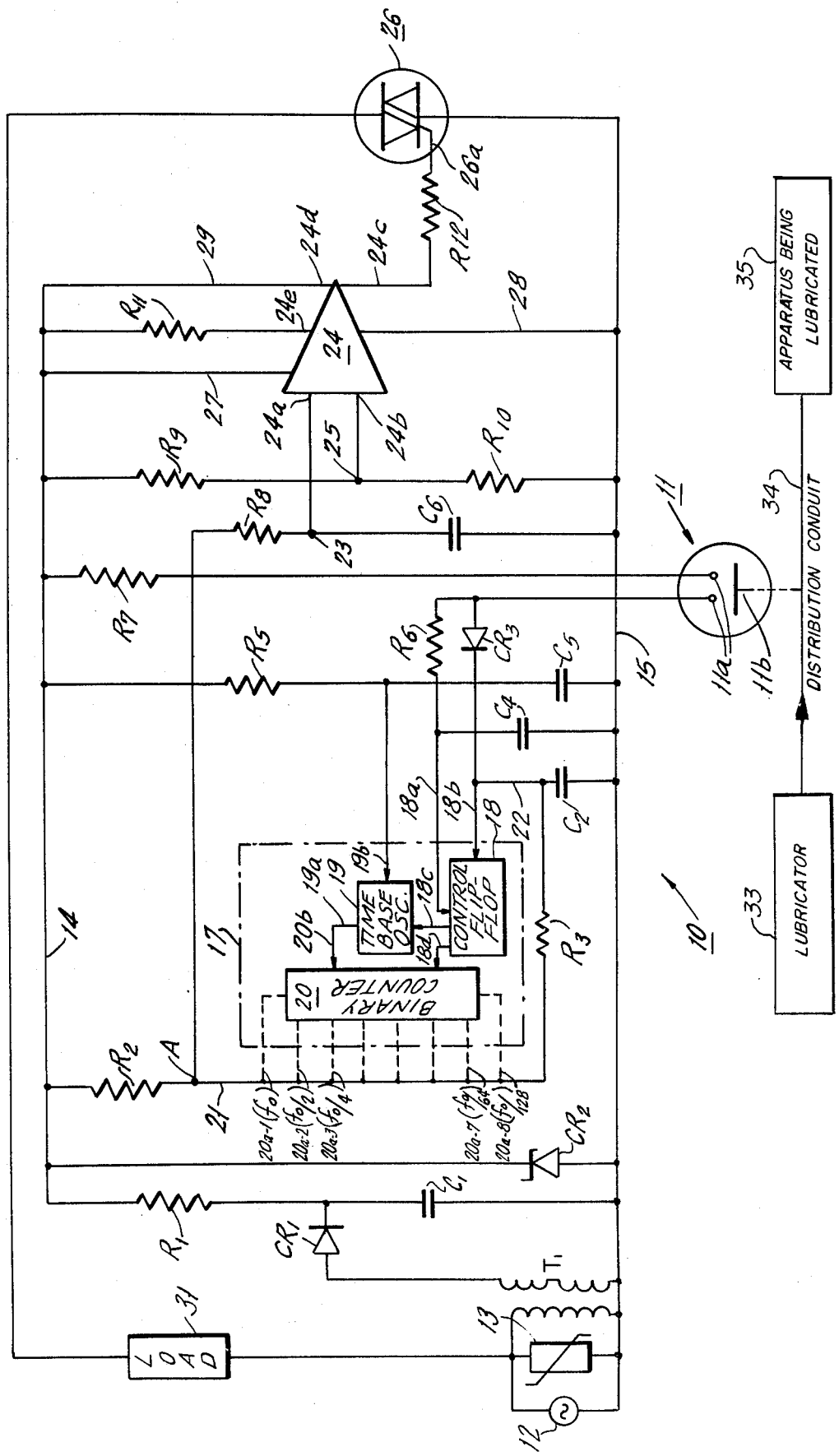

ELECTRONIC PRESSURE CYCLE INDICATOR

BACKGROUND OF THE INVENTION

The present invention relates to alarm devices and more particularly to a novel alarm device having an extremely long time delay period for monitoring a cyclic fluid pressure condition.

In lubricating systems it is typical to provide a cyclically operable lubricant pumping apparatus which is periodically operated to build lubricant pressure to a suitable level. The lubricant under pressure is then metered to provide a measured flow of the lubricant to the equipment being so lubricated.

Since the metering of the flow of lubricant is adjusted to provide lubricating fluid sufficient for a substantial operating interval, the pump is typically operated to supply lubricant at intervals separated by substantially long time periods which are usually of the order of hours. However, it is very important to be assured that the pump is in fact operating properly since failure in providing adequate lubricant flow may result in severe damage to the equipment being so lubricated, necessitating the use of circuitry which is capable of developing time delays which are of the order of a few hours.

Various systems have been devised to ascertain whether automatically operating cyclic liquid dispensing apparatus is operating properly or is malfunctioning. A conventional sensing device for determining whether there has been a malfunction comprises a pressure sensing device for sensing system pressure after each periodic pulse of liquid pressure. Such devices are coupled with a timing device for generating a time interval that is slightly longer than the time that elapses between pump operations, so that if the presence of a predetermined quantity of lubricant at the correct pressure is not sensed within a predetermined time period, an indication is given that a malfunction has occurred. The pressure sensing device is associated with an automatic reset timer. The pressure sensing device resets the timing device by activating a reset device in the timing device. An indicator device is connected with the pressure sensing device to indicate when the pressure sensing device has responded to an underpressure due to a malfunction in the system. Such prior art systems are expensive since they require a pressure sensing device, a complex and expensive timer and a complex and expensive recycling means.

An effort to obtain similar operations through a less expensive apparatus led to the development of the hydraulic pressure cycle indicator described in U.S. Pat. No. 3,583,528. One disadvantage of this system resides in the fact that large time variations occur due to changes in lubricant viscosity with ambient temperature thereby significantly altering the bleed-off interval.

BRIEF DESCRIPTION OF THE INVENTION

The present invention is characterized by providing a novel inexpensive time delay circuit capable of providing extremely long time delay periods before time-out, which periods are typically of the order of hours, so as to provide an indication in the form, for example, of a warning light, which advises personnel of the fact that the pump is or is not operating properly and/or that the periodic flow of lubricant has or has not been terminated for a prolonged and abnormal period of time since its last interval of activation. Of course, alternate warning systems can be used or the alarm can be directly coupled to the electrical contents of the apparatus being lubricated to initiate shutdown due to the interruption of full lubrication, etc. The system is further distinguished by being immune to changes in lubricant viscosity.

In the present invention, a pressure switch means is activated simultaneously with the flow of lubricant at a predetermined pressure and under control of a pump to set a bistable flip-flop which serves as a control circuit. The setting of the flip-flop activates an oscillator having an adjustable time base whose time constant is controlled by its R.C. timing elements. Each pulse developed by the oscillator is applied to an electronic incremental counter means to advance the count thereof. Logical gating means develops a predetermined output level indicating that the counter means has reached a predetermined (and adjustable) count, and said gating means causes the control flip-flop to be reset. A comparator compares the voltage level at the output of the gating means against a preset threshold and activates an electronic switch when the threshold level is reached to activate an alarm. A second time delay provided by a second timing circuit assures that retriggering of timing means occurs after resetting of the control flip-flop in the event that the pressure switch is closed just before termination of the delay period to prevent erroneous activation of the alarm means. The employment of an oscillator having an adjustable time base in conjunction with the adjustable counter means prevents transients in the supply line powering the circuit from significantly altering the desired time delay period.

BRIEF DESCRIPTION OF THE DRAWINGS AND OBJECTS

It is therefore one primary object of the present invention to provide a novel monitoring circuit including adjustable time delay means for developing a warning indication whenever the time between intervals of lubricant flow are abnormally long.

The above as well as other object of the present invention will become apparent from a consideration of the ensuing description and drawing.

The sole FIGURE is a schematic diagram showing one preferred embodiment of the present invention.

DETAILED DESCRIPTION OF THE INVENTION AND FIGURES

The FIGURE shows a schematic diagram of monitoring means 10 embodying the principles of the present invention and which is comprised of a cyclic lubricating system shown in simplified fashion and comprising a lubricator 33 and apparatus being lubricated 35 and a conduit 34 coupled therebetween. Such systems are described in U.S. Pat. Nos. 3,091,306; 3,072,300; 2,856,024; 2,784,808, among others. A typical one of these systems comprises a continuously operating cam driven motor in the lubricator 33 (not shown herein for purposes of simplicity). Although the invention is described as being utilized in conjunction with a lubricating system, it should be understood that this description is merely exemplary and that the invention may be employed in any hydraulic system whether motor or non-motor driven and is especially advantageous for use in hydraulic systems which experience fluctuating pressures.

The lubricant is periodically dispensed into a distribution conduit for supplying the apparatus being lubricated at periodic intervals. One suitable mechanism for providing the periodic replenishing of lubricant is shown, for example, in FIG. 1 of copending application Ser. No. 518,041 filed Oct. 25, 1974.

Pressure switch 11, which senses the pressure in line 34, is one constituent of the monitoring means 10 which, in turn, is comprised of an A.C. source 12 coupling an A.C. signal across varistor 13. The power source, in the preferred embodiment is preferably a 115 volt A.C. supply, either 50 or 60 Hz. Varistor 13 is coupled across the primary winding of transformer T1 to protect the circuit from overvoltage spikes which may occur in the supply line. The secondary winding of transformer T1 preferably supplies 24 volts A.C. to a Zener regulated D.C. power supply which is comprised of diode CR1, capacitor C1, resistor R1 and Zener diode CR2 which serves to regulate the voltage across positive D.C. bus 14 and ground bus 15.

A programmable counter/timer circuit 17 is connected between the power and ground buses 14 and 15 to power the circuits contained therein.

The programmable timer/counter circuitry 17 is basically comprised of a bistable control flip-flop 18 having trigger and reset inputs 18a and 18b respectively and having outputs 18c and 18d respectively coupled to time base oscillator 19 and binary counter 20. The binary state of the output 18c serves to selectively disable or activate time base oscillator 19. The binary state of output 18d serves to clear binary counter 20 when in a first state and, when in the opposite binary state enables the binary counter 20 to be incremented.

Time base oscillator 19 may, for example, be any suitable type of oscillator for generating incrementing output pulses at a rate determined by an RC timing circuit comprised of resistor R5 and capacitor C5 connected between power and ground buses 14 and 15 respectively. As one exemplary embodiment, the time base oscillator 19 may comprise a unijunction transistor which is triggered to conduct when the voltage across C5 achieves a predetermined threshold level, so as to apply negative going pulses developed at the output 19a oscillator 19 and which are applied to the trigger input of counter 20. Each time the unijunction transistor conducts, capacitor C5 is discharged until the level at the input to the unijunction transistor drops below the threshold level, at which time capacitor C5 will again charge with the time constant being the product of R5 and C5. R5 may be an adjustable resistor.

Binary counter 20 is a multistage electronic counter. In the example shown, counter 20 is provided with eight stages capable of accumulating a maximum of 255 pulses (i.e. $2^8-1$). Outputs 20a-1 through 20a-8 are selectively coupled to common lead 21 in any desired combination. Lead 21, in turn, is coupled between one terminal of resistor R2 and one terminal of resistor R3. The opposite terminal of R2 is coupled to power bus 14, while the opposite terminal of R3 is coupled through capacitor C2 to ground bus 15 and through lead 22 to the reset input 18b of control flip-flop 18. The connection of all or a selected number of the outputs 20a-1 through 20a-8 constitute a "wired-OR" logical gating circuit whose output is coupled to reset input terminal 18b for resetting bistable control flip-flop 18 only when the output of the "wired-OR" gate is high. Assuming that bistable control flip-flop 18 has been reset, binary counter 20 is reset through output lead 18d causing all outputs 20a-1 through 20a-8 of binary counter 20 to be in the high state. When a trigger input is applied to terminal 18a (in a manner to be more fully described) control flip-flop 18 is set to enable time base oscillator 19 to be free-running and to remove the clear signal from binary counter 20. This causes all outputs 20a-1 through 20a-8 to go low (i.e. to go to ground level).

Time base oscillator 19 applies negative going pulses to input 20b of counter 20 wherein the voltage levels of all of the outputs 20a-1 through 20a-8 are alternated between ground and high states at a frequency $1/(2^N R5C5)$ where N represents the respective output stage. The output connections 20a-1 through 20a-8 which are selectively coupled to common lead 21 all go to ground upon application of a trigger pulse to control flip-flop 18 and remain in the low state for a time duration equaling the sum of the times each output connected to common lead 21 remains low. For example, output 20a-1 remains low for T seconds wherein $T =$ R5C5. Output 20a-2 remains low for a time interval 2T; output 20a-3 remains low for a time equal to 4T; output 20a-4 remains low for a time interval 8T; . . . and output 20a-8 remains low for a time interval equal to 128T. All of the outputs then return to a high state after the termination of the aforementioned time intervals. The voltage at terminal A however will not go high until all of the outputs 20a-1 through 20a-8 which are coupled to lead 21 are simultaneously high, at which time a high level is applied to reset 18b through resistor R3 causing the output at terminal A to remain high. For example, if all leads 20a-1 through 20a-8 are coupled to lead 21, the output level at terminal 18 will go high after a time interval 255T. Diode CR3 is polarized so as to prevent the positive voltage applied to input 18b from being coupled to trigger input 18a so as to prevent erroneous triggering of control flip-flop 18. Capacitor C2 protects the circuit from being erroneously reset by noise or other transients.

In the event that a transient occurs during a timing interval $(2^N-1)T$ at most only one output pulse developed by the time base oscillator will be affected causing an insignificant alternation in the overall time interval.

Pressure switch 11 is comprised of a pair of stationary contacts 11a and a movable contact 11b which bridges contacts 11a at the periodic intervals during which the lubricant is dispensed and reaches a threshold pressure level. A contact closure which occurs when point A is at ground and before the expiration of the time delay set by R5 and C5 causes the programmable timer/counter 17 to be reset and retriggered. Resistor R6 and capacitor C4 provide a time delay to allow control flip-flop 18b to be reset before being retriggered wherein contact closure of contact 11b substantially instantaneously applies a reset pulse to input 18b while applying a trigger pulse to input 18a after a time delay $T_2$ where $T_2 = R^6.C4$. The output of circuit 17 appearing at terminal A goes high breifly during this time delay until circuit 17 is retriggered. Resistor R7 connected between one stationary contact 11a and power bus 14 serves to protect the power supply in the event that the connections to circuit 17 are accidentally grounded.

Output A is further coupled through resistor R8 and capacitor C6 to ground bus 15. The common terminal 23 therebetween is coupled to one input 24a of comparator 24. The remaining input 24b is coupled to the common terminal 25 between resistors R9 and R10 forming a voltage divider circuit which is coupled between power and ground buses 14 and 15, respectively.

The voltage appearing at terminal 25 serves as a threshold level controlling the operation of comparator 24. Output terminal 24c of comparator 24 is coupled through resistor R12 to the trigger input 26a of triac 26. Resistor R12 serves to limit gate current to gate electrode 26a. Comparator 24 is connected between power and ground buses 14 and 15 through conductors 27 and 28 respectively. Output 24d is also connected to power bus 14 by conductor 29. The current applied to input 24e by resistor R11, whose opposite terminal is connected to power bus 14, controls the gain of comparator circuit 24 which is such that sufficient gain is provided for comparator 24 so that output 24c is at ground level if the voltage at input 24b is greater than the voltage in input 24a and such that output 24c is essentially at the positive supply voltage if the voltage applied at input 24a is greater than the voltage applied to input 24b.

The voltage at input 24a is essentially the same as the voltage at point A. However, resistor R8 and capacitor C6 provide a time delay between any change in voltage level at point A and a corresponding change at input 24a. The time delay provided by R8 and C6 prevents the voltage level at input 24a from changing during the time interval required to retrigger control flip-flop 18 by closure of pressure activated switch 11. Triac 26 is shown as being coupled across a load 31 and the A.C. supply source 12.

Let it be assumed that power is initially supplied to the circuit and that the pressure actuated switch 11 is open. The output of programmable timer/counter 17 (terminal A) will be high and will be higher than the threshold level at input terminal 24b of comparator 24 causing output 24c to go high resulting in the conduction of triac 26. A closed circuit is thus provided to load 31 which may, for example, consist of an audible and/or visual alarm. If pressure switch 11 is momentarily closed, control flip-flop 18 will be immediately reset and, after a time delay controlled by R6 and C4, control flip-flop 18 will be set causing binary counter 20 to be cleared so that all of its outputs will be low and hence the voltage level at terminal A will go low causing the voltage level at input 24a of comparator 24 to be less than the voltage at input 24b. This causes output 24c of comparator 24 to go low thereby turning off triac 26 and hence decoupling load 31 from A.C. source 12. Retriggering of control flip-flop 18 further drives oscillator 19 into its free-running state.

As was described hereinabove, the voltage level at terminal A will remain low until all of the outputs 20a-1 through 20a-8 coupled to conductor 21 go high after a time interval which is a function of the number of outputs 20a-1 through 20a-8 coupled to lead 21 and which is further a function of the time constant of oscillator 19 which is determined by R5 and C5. In the event that pressure actuated switch 11 remains open when the output at terminal A goes high, comparator 24 will activate triac 26 and couple power source 12 to load 31 to provide an alarm indication.

If pressure actuated switch 11 is momentarily closed at any time before the expiration of the present time delay, bistable control flip-flop 18 will first be reset and then retriggered to initiate a new time delay. During the brief delay necessary between reset and retriggering, the voltage at terminal A will go to its high state. However, resistors R6, R8, R9 and R10 and capacitors C4 and C6 are all selected to insure that circuit 17 will be retriggered before the voltage at input 24a of comparator 24 exceeds the voltage at input 24b so as to prevent erroneous turn-on of triac 26.

The time delay which is a function of both the number of outputs of counter 20 which are coupled to conductor 21 and the time base of oscillator 19 (which is controlled by the values R5 and C5) is capable of providing programmable time delays from microseconds up to time intervals as much as 5 days. The particular time delay selected is correlated with the lubricant dispensing intervals. For example, let it be assumed that the motor operated cam serves to cause lubricant to be dispensed at 2 hour intervals. The programmable timer/counter is adjusted by selection of the values R5 and C5 and by selection of the number of outputs 20a-1 through 20a-8 connected to lead 21 so as to provide a time delay interval which is at least slightly longer than the 2 hour interval at which lubricant is dispensed. For example, the time delay may be 2 hours and 15 minutes. Thus, if for any reason the lubricant being dispensed is insufficient to activate the pressure actuated switch 11 which may, for example, be coupled in the lubricant distribution conduit 34, the programmable timer/counter 17 will "time out" to create an alarm condition. Assuming normal operation of the lubricant dispensing mechanism, pressure actuated switch 11 will momentarily close at 2 hour intervals and in any case before "time out" of the programmable timer/counter 17 causing it to be reset and then retriggered thereby reinitiating a new timing interval. As was set forth hereinabove, momentary closure of pressure actuated switch 11 substantially instantaneously resets bistable control flip-flop 18 (through diode CR3) causing all of the outputs of 20a of counter 20 to go high and further causes time base oscillator 19 to be disabled. After a predetermined time delay (controlled by C4 and R6) bistable control flip-flop 19 is retriggered to cause turn-on of time base oscillator 19 causing counter 20 to have all of its outputs 20a to be reset to the low level. Even though terminal A will momentarily go high during the aforementioned reset operation, common terminal 23 is prevented from going high by the delay circuit comprised of R8 and C6 to prevent input 24a of comparator 24 from going to a voltage level higher than input terminal 24b during the brief time delay between reset and retriggering of bistable control flip-flop 18. Thus erroneous turn-on of triac 26 is prevented during the reset and retriggering operations.

The above description has been set forth for a normally "off" output, i.e. or an output in which load 31 is normally deenergized until programmable timer/counter 17 "times out", at which time load 31 is energized if the time delay of circuitry 17 expires without a reset. The circuitry may be altered to provide a normally "on" output in which load 31 is normally energized unless the time delay expires without a reset, which alteration is accomplished by coupling terminal 23 to comparator input 24b and by coupling terminal 25 to comparator input 24a. In this alternative arrangement, load 31 is normally energized until programmable timer/counter circuit 17 "times-out", at which time triac 26 is triggered to the off state to deenergize load 31. This latter arrangement may be utilized, for example, to turn "off" a normally "on" lamp or to control the motors or other equipment being lubricated to be turned off to prevent any damage or overheating as a result of the failure to dispense the lubricant at the preset intervals.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Adjustable timing means for monitoring intervals between operations occurring in a cyclical periodic fashion to provide an alarm condition when the time period between successive operations is abnormally long comprising:

oscillator means for generating timing pulses at spaced intervals T;

N-stage binary counter means coupled to said oscillator means for accumulating pulses;

bistable control means for disabling said oscillator means and said counter means when in a first state and for enabling said oscillator means and said counter means when in a second state;

switch means being activated upon the occurrence of one of said operations to drive said control means to said second state and reset said counter means;

a power source and reference means coupled to said power source for establishing a predetermined threshold voltage;

logical gating means;

comparator means coupled to said gating means and said reference means for generating an output signal when the voltage across said output of said gating means exceeds said predetermined threshold;

alarm means coupled to said output of said comparator means for activation when said comparator means generates an output signal;

the outputs of selected stages of said counter means being coupled to said gating means to adjust the time interval $T_T$ between driving of said control means to said second state and said generation of an output by said comparator means, wherein $T \leq T_T \leq (2^N-1)T$.

2. The device of claim 1 wherein said control means is provided with reset and trigger inputs, the output of said gate means being coupled to said control means reset input for driving said control means to said first state when said gating means output goes high and thereby prevent said oscillator means from generating subsequent timing pulses and thereby halt the counting operation of said counting means.

3. The device of claim 2 further comprising means coupled between said switch means and said bistable control means reset input for instantaneously driving said control means to said first state and delay means coupled between said switch means and said trigger input for driving said control means to said second state upon the actuation of said switch means and subsequent to the resetting of said bistable control means.

4. The device of claim 3 further comprising delay means coupled between said logical gating means and said comparator means for delaying the application of a change in the output state of said gating means to said comparator means to prevent said electrical switch means from being erroneously triggered to the conductive state.

\* \* \* \* \*